(12) United States Patent
Cuppett et al.

(10) Patent No.: US 9,293,281 B2
(45) Date of Patent: Mar. 22, 2016

(54) TANK MOUNTING STRUCTURE FOR DEAD TANK CIRCUIT BREAKER

(71) Applicant: ABB Technology AG, Zurich (CH)

(72) Inventors: Matthew D. Cuppett, Uniontown, PA (US); Christian Daehler, Greensburg, PA (US); Elizabeth L. Dahm, Pittsburgh, PA (US)

(73) Assignee: ABB Technology AG, Zurich (CH)

( * ) Notice: Subject to any disclaimer, the term of this patent is extended or adjusted under 35 U.S.C. 154(b) by 60 days.

(21) Appl. No.: 14/264,343

(22) Filed: Apr. 29, 2014

(65) Prior Publication Data

US 2015/0311017 A1    Oct. 29, 2015

(51) Int. Cl.
*H01H 33/53* (2006.01)

(52) U.S. Cl.
CPC ..................... *H01H 33/53* (2013.01)

(58) Field of Classification Search
CPC ..... H01H 9/0044; H01H 9/02; H01H 9/0207; H01H 2033/6623; H01H 33/53; F16B 35/005; F16B 39/04; H01B 17/16
USPC ........... 218/97, 134; 335/202; 200/301, 48 R; 248/220.42; 411/393, 315; 29/622
See application file for complete search history.

(56) References Cited

U.S. PATENT DOCUMENTS

| | | | |
|---|---|---|---|
| 3,576,293 A * | 4/1971 | Landis et al. ................ 238/287 |
| 5,795,029 A * | 8/1998 | Ma .......................... 297/440.16 |
| 6,478,518 B1 * | 11/2002 | Hwang ........................ 411/104 |
| 7,281,848 B2 * | 10/2007 | Kendall et al. ............... 378/193 |
| 2007/0289094 A1 * | 12/2007 | Lowe et al. ..................... 16/238 |
| 2009/0263250 A1 * | 10/2009 | Quell et al. .............. 416/204 R |
| 2010/0270056 A1 * | 10/2010 | Stull et al. ................ 174/161 R |
| 2010/0270136 A1 | 10/2010 | Wolfe |

* cited by examiner

*Primary Examiner* — Renee Luebke
*Assistant Examiner* — William Bolton
(74) *Attorney, Agent, or Firm* — Manelli Selter PLLC; Edward J. Stemberger

(57) ABSTRACT

Mounting structure is provided for mounting a tank to support structure. The tank has a flange extending from a body thereof. The mounting structure includes at least a pair of first bores extending into the flange in a first direction. At least a pair of second bores. Each second bore extends into the flange in a direction generally transverse with respect to an associated first bore so that each second bore communicates with the associated first bore. A pin is disposed in each of the second bores. Each pin has a threaded pin bore that aligns axially with the associated first bore. A bolt is disposed through a bolt hole in the support structure, into an associated first bore and in threaded engagement with the threaded pin bore of an associated pin so as to secure the tank to the support structure.

13 Claims, 6 Drawing Sheets

TANK MOUNTING STRUCTURE FOR DEAD TANK CIRCUIT BREAKER

FIELD

The invention relates to high voltage dead tank circuit breakers and, more particularly, to improved mounting structure for securing tanks of the circuit breaker to support structure.

BACKGROUND

Dead tank circuit breakers are commonly found in substations and are operable to selectively open and close electrical connections contained within a sealed tank filled with dielectric material for reducing arcing.

With reference to FIGS. 1 and 2, a conventional dead tank circuit breaker is shown, generally indicated at 10, in accordance with an embodiment. Circuit breaker 10 is a preferably a three phase circuit breaker, and thus includes three pole assemblies including outer pole assemblies 12*a* and 12*c* and a central pole assembly 12*b*. Each pole assembly includes a first electrical conductor 14 carried in a first bushing 16 and a second electrical conductor 18 carried in a second bushing 20. As is known in the art, electrical power lines are coupled to the first and second electrical conductors, and the circuit breaker 10 selectively opens or closes the electrical connection therebetween. A bell crank 22*a*, 22*b*, 22*c*, is associated with a respective pole assembly 12*a*, 12*b* and 12*c*. The bell cranks are interconnected by a gang-style linkage structure including interconnecting shafts so that all three poles assemblies are actuated at the same time by a single operating mechanism, generally indicated at 23. Each pole assembly 12*a*, 12*b* and 12*c* includes a tank 24 that houses the electrical contacts of the breaker 10. Each tank 24 is fixed to support structure 28 by conventional bolts 30.

The through holes that receive the bolts 30 may have large tolerances with can result in play in the bolt connection. Furthermore, poor bolt connections can occur due to bolting into low strength material of the tank.

Thus, there is a need to provide a robust tank mounting structure for mounting tanks to a support structure of a dead tank circuit breaker that allows accurate placement of the tanks regardless of tolerances.

SUMMARY

An object of the invention is to fulfill the need referred to above. In accordance with the principles of the present invention, this objective is obtained by providing mounting structure for mounting a tank of a dead tank circuit breaker to support structure. The tank has a flange extending from a body thereof. The support structure has bolt holes for receiving bolts. The mounting structure includes at least a pair of first bores extending into the flange in a first direction. At least a pair of second bores is provided with each second bore extends into the flange in a direction generally transverse with respect to an associated first bore so that each second bore communicates with the associated first bore. A pin is disposed in each of the second bores of the pair of second bores. Each pin has a threaded pin bore that aligns axially with the associated first bore. A bolt is disposed through an associated bolt hole of the support structure, in an associated first bore and in threaded engagement with the threaded pin bore of an associated pin so as to secure the tank to the support structure.

In accordance with another aspect of an embodiment, a method secures a tank of a dead tank circuit breaker to support structure. The tank has a flange extending from a body thereof. At least a pair of first bores extends into the flange in a first direction. At least a pair of second bores is provided with each second bore extending into the flange in a direction generally transverse with respect to an associated first bore so that each second bore communicates with the associated first bore. The support structure has bolt holes for receiving bolts. The method places the tank on the support structure such that each first bore of the pair of first bores is aligned with an associated bolt hole in the support structure. A pin is placed in each of the second bores of the pair of second bores. Each pin has a threaded pin bore that aligns axially with the associated first bore. A bolt is inserted through each associated bolt hole of the support structure, into an associated first bore and into threaded engagement with the threaded pin bore of an associated pin so as to secure the tank to the support structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
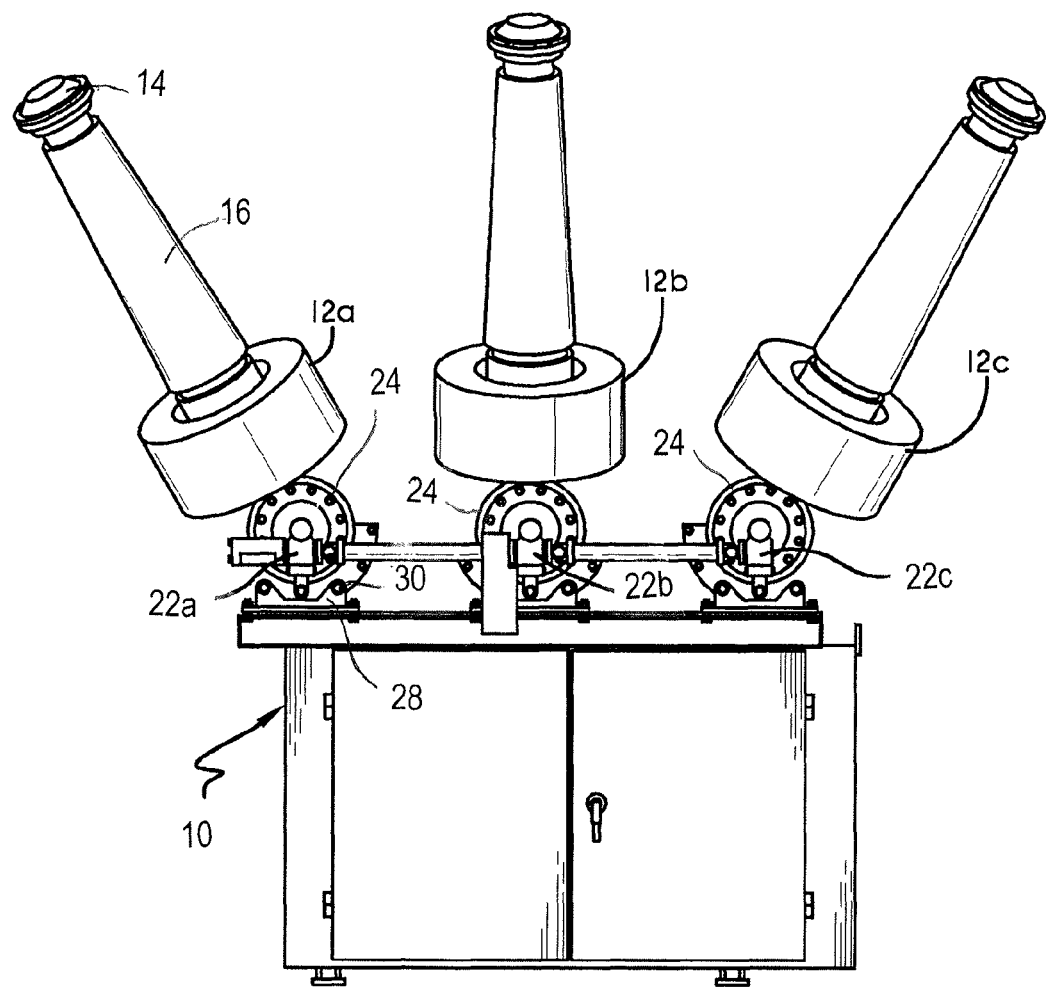
FIG. 1 is a front view of a conventional high voltage dead tank circuit breaker.
Figure 2:
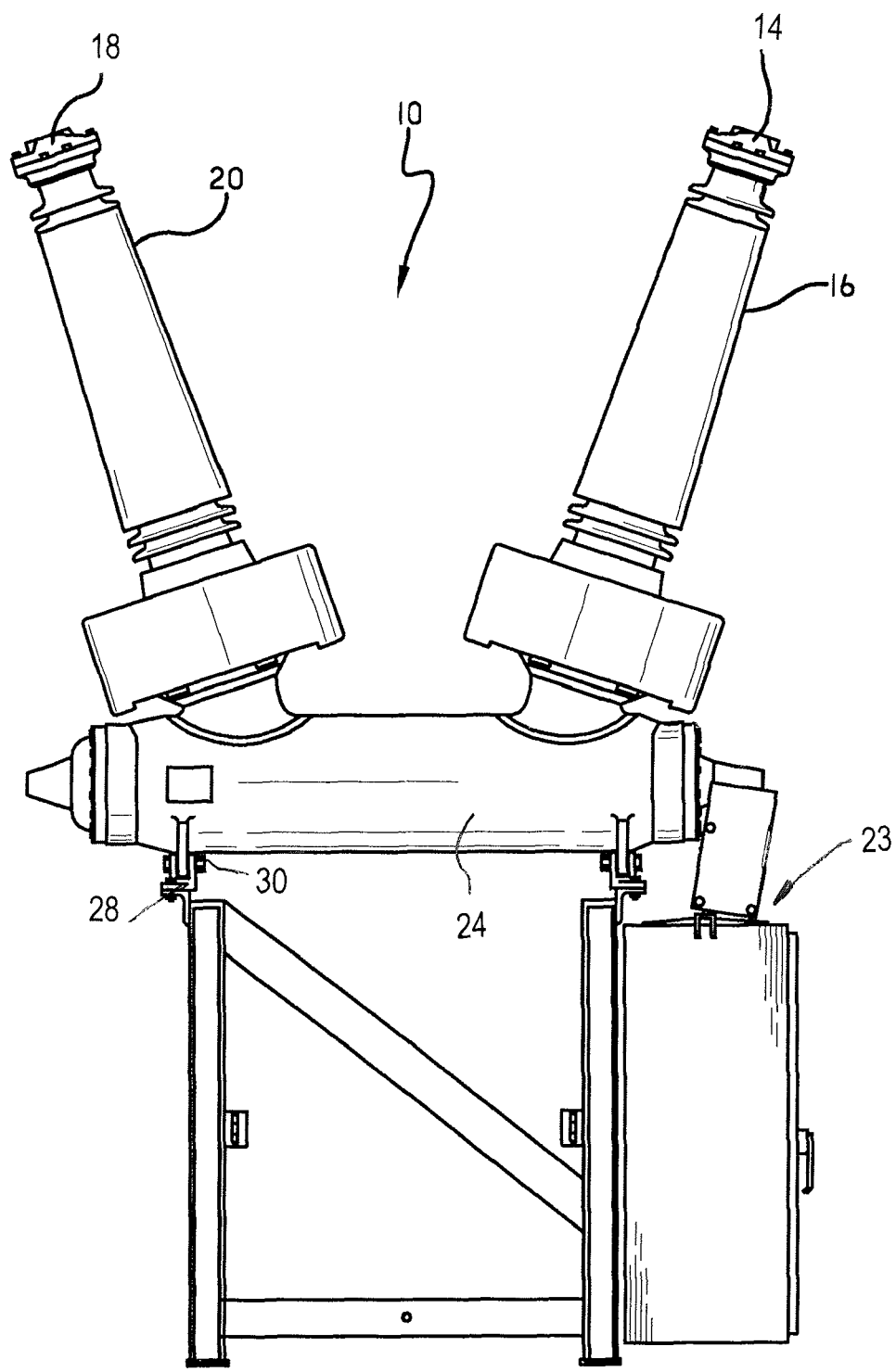
FIG. 2 is a side view of the conventional circuit breaker of FIG. 1.
Figure 3:
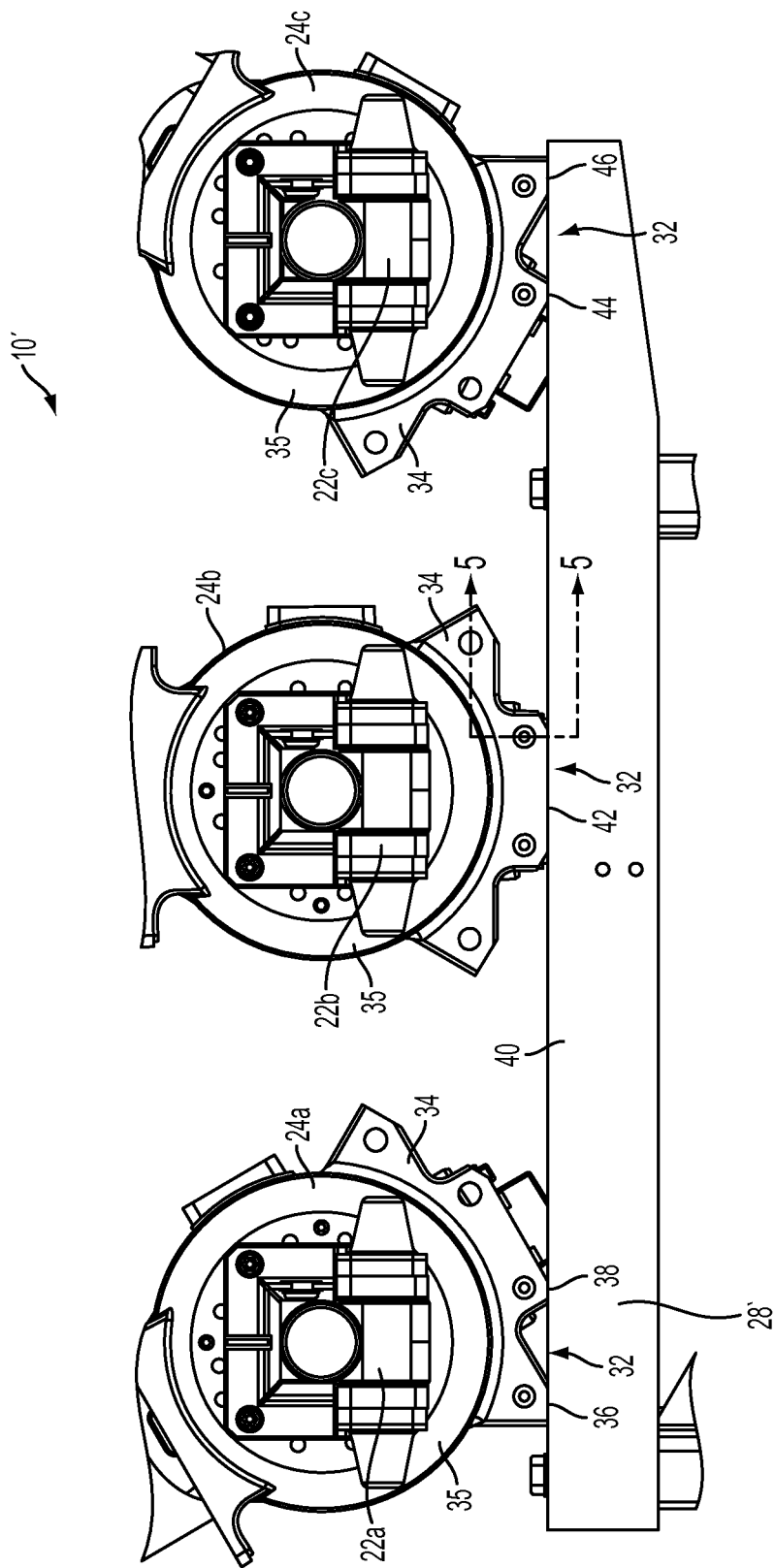
FIG. 3 is a front view of a portion of a dead tank circuit breaker showing tanks thereof mounted to support structure using mounting structure in accordance with an embodiment.
Figure 4:
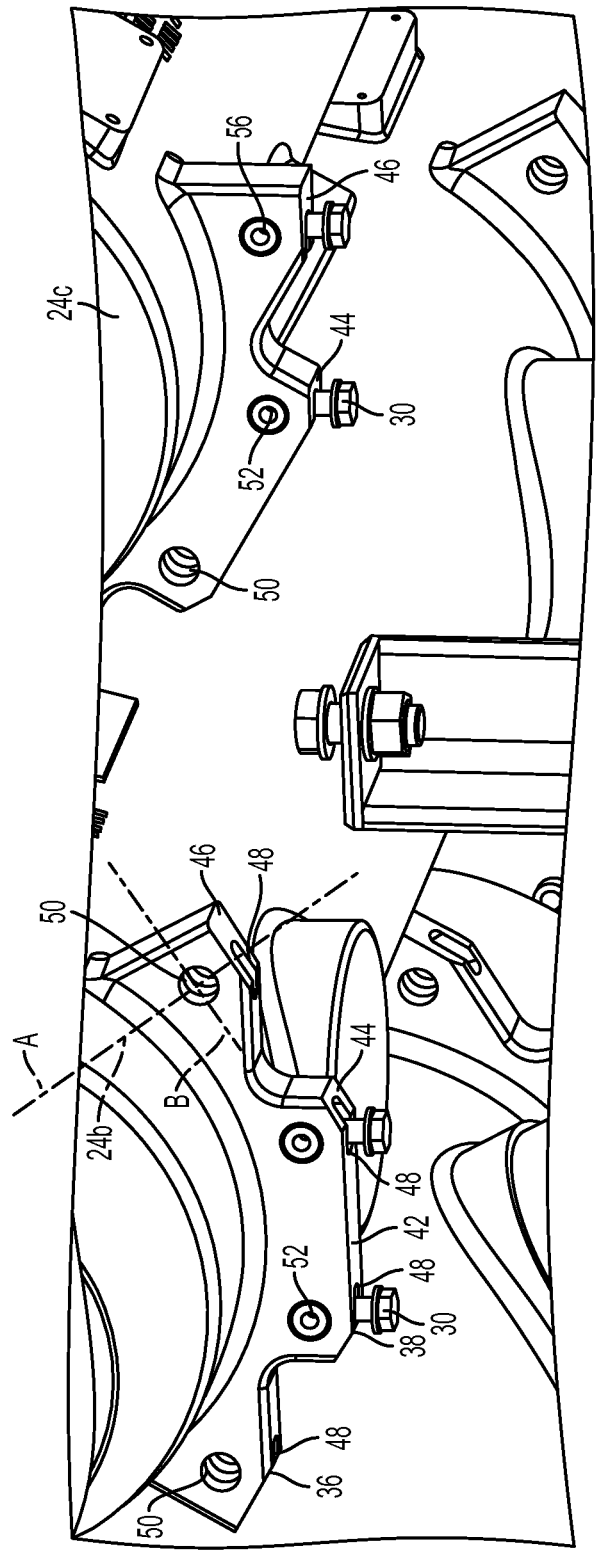
FIG. 4 is a view of the mounting structure associated with the central tank and an outer tank of FIG. 3, shown decoupled from the support structure.

With reference to FIG. 3, a portion of a dead tank circuit breaker is shown, generally indicated at 10', in accordance with an embodiment. The circuit breaker 10' is similar to that shown in FIGS. 1 and 2 but for mounting structure, generally indicated at 32, for mounting the tanks 24*a*, 24*b*, 24*c* to support structure 28. Each tank 24 includes a flange 34 extending from a body 35 of the tank at each end of the tank 24. The flange 34 is integral with or fixed to the body 35. As best shown in FIG. 4, each flange 34 has machined surfaces defining a planar mounting surface. The tanks 24*a*, 24*b* and 24*c* are configured identically, but the outer tanks 24*a* and 24*c* are rotated with respect to the inner tank 24*b* upon mounting to the support structure 28'. Thus, each flange 34 includes first, second and third planar mounting surfaces so as to be able to mount the tank in one of three different positions. In the embodiment, machined surfaces 36 and 38 define the first mounting surface that engages the planar surface 40 of the support structure when the tank 24*a* is mounted. A single machined surface 42 defines the second mounting surface that engages the planar surface 40 of the support structure when the tank 24b is mounted. Machined surfaces 44 and 46 define the third mounting surface that engages the planar surface 40 of the support structure when the tank 24c is mounted.

Figure 5:
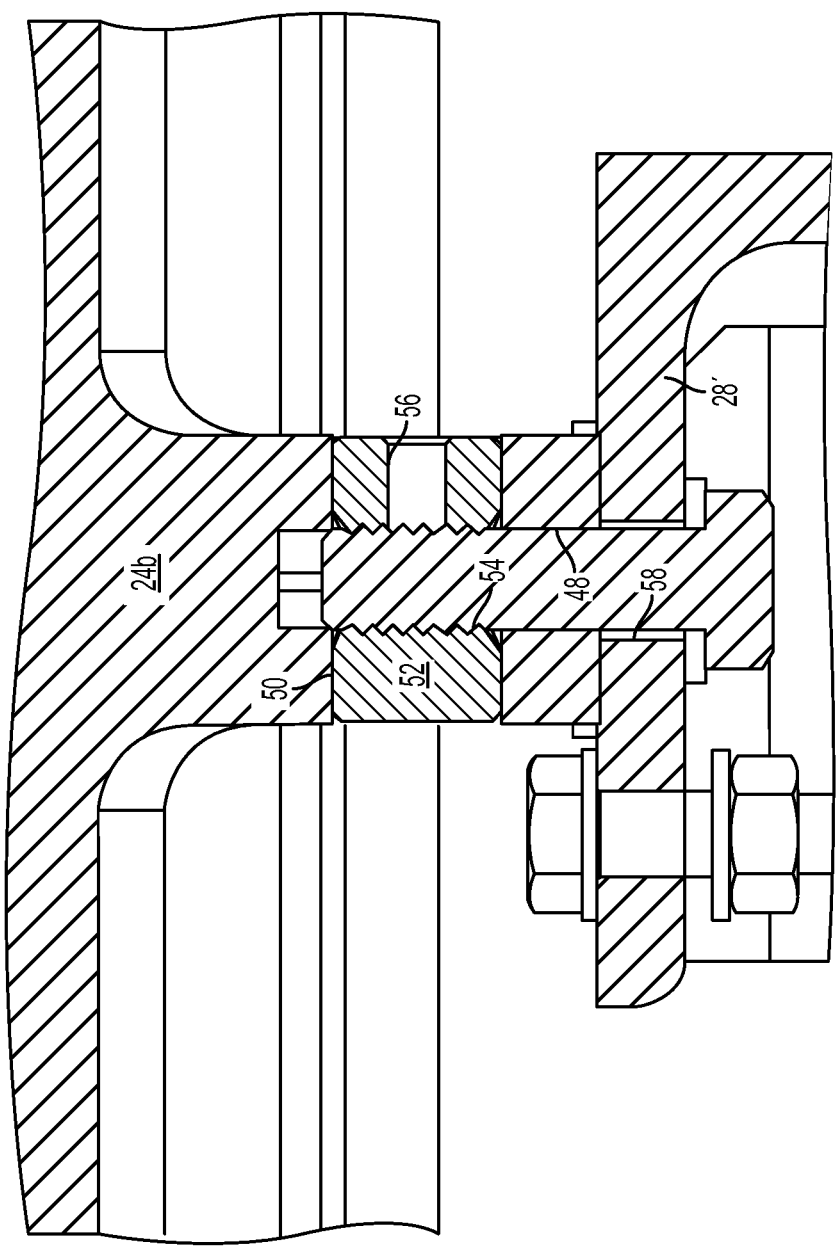
FIG. 5 is a cross-sectional view of the mounting structure taken along the line 5-5 of FIG. 3.

It is noted that FIG. 4 shows tanks 24b and 24c decoupled from the support structure 28' for ease of describing parts of mounting structure 32 of the embodiment. Thus, as best shown in FIGS. 4 and 5, each flange 34 includes the mounting structure 32 for mounting the tank to the support structure 28'. The mounting structure includes a first bore 48 provided through each machined surface 36, 38, 42, 44 and 46 for receiving an associated bolt 30. Each first bore 48 extends in a first direction (e.g., along axis A). In the embodiment, each bore 48 is preferably elongated in the direction transverse with respect to axis A to provide some lateral movement of the bolt 30 during assembly. The mounting structure includes a second bore 50 extending along axis B which is disposed 90° with respect to axis A. Thus, each second bore 50 is disposed generally transversely with respect to an associated first bore 48 so as to communicate therewith.

As shown in FIG. 5, each pin 52 includes a threaded pin bore 54 there-through. An end of each pin 52 includes a taped hole 56 used for inserting the pin 52 into the associated bore 50. The threaded pin bore 54 is constructed and arranged to engage threads of a bolt 30, which will be explained more fully below. The bolts 30 and pins 52 can be considered to be part of the mounting structure 32.

With reference to FIG. 5, the pin 52 is inserted into the second bore 50 so that the threaded pin bore 54 aligns axially with associated first bore 48. The tank (e.g., tank 24b) is placed on the support structure 28' such that the associated first bore 48 is aligned with a bolt hole 58 in the support structure 28'. It is noted that the pin 52 can be inserted into the second bore 50 after the tank is placed. The bolt 30 is inserted through bolt hole 58 in the support structure 28' into the first bore 48 and into threaded engagement with the pin bore 54 to secure the flange 34 and thus the tank to the support structure 28'.

As shown in FIG. 3, based on the intended orientation of the tank, two pins 52 are inserted into the appropriate two second bores 50 of the four second bores 50 provided in each flange 34. Thus, the common flange 34 for each tank allows mounting the tanks in three different orientations.

Figure 6:
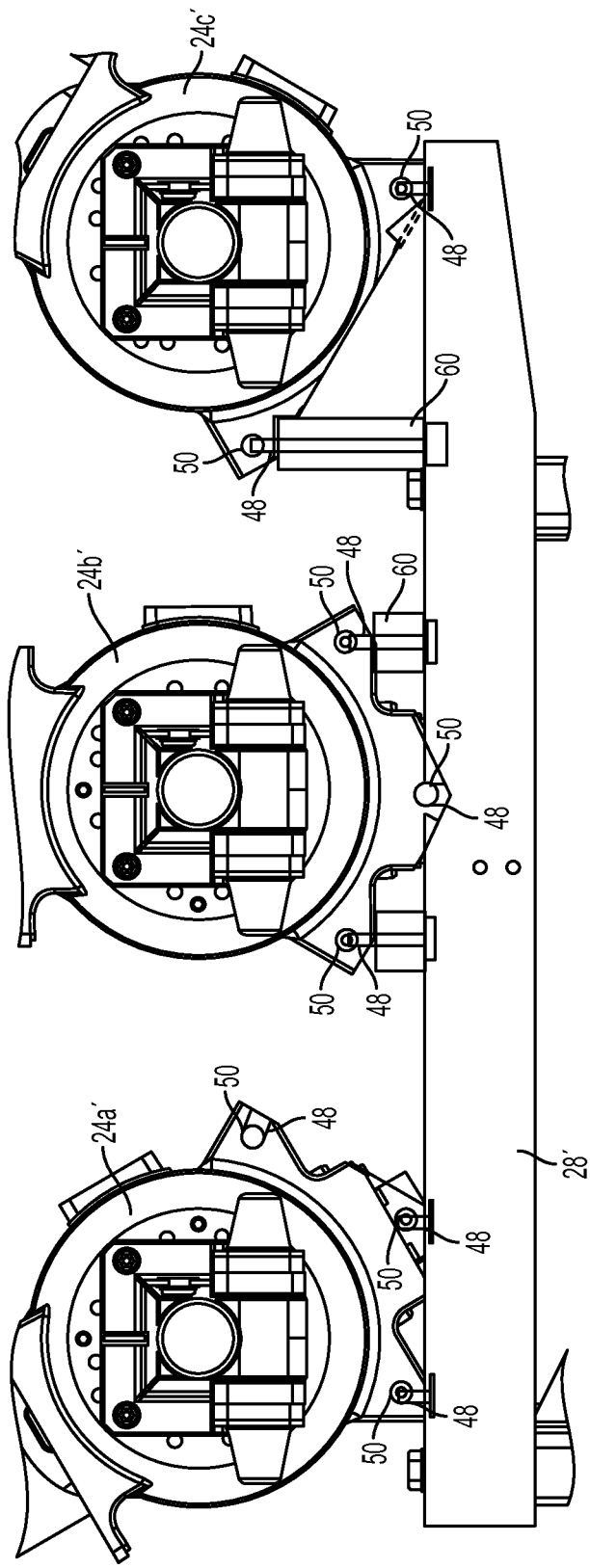
FIG. 6 is a front view of a dead tank circuit breaker showing additional embodiments of the mounting structure.

With reference to FIG. 6, other embodiments of the mounting structure are shown. Instead of using four first bores 48 and four associated second bores 50, tanks 24a' and 24b' employ a flange that has three first bores 48 and three associated second bores 50 while the flange of tank 24c' employs only two first bores and two associated second bores 50. Spacers 60 around the bolts 30 may be employed between the flange 34 and support structure 28' to facilitate mounting. In each embodiment, first and second sets of an engaged pin and bolt are used at each end of the associated tank for mounting the tank to the support structure 28' in one of three different positions.

The high strength pins 52 allow for higher torque than tapping directly into the low strength tanks 24 and thus makes a more reliable connection between the tanks and the support structure 28'. The mounting structure 32 permits accurate placement of the tanks 24 on the support structure 28' despite large tolerances. The pin location is not sensitive to tolerances. The pins 52 allow for no play (e.g., helps alignment) and the machined surfaces 36, 38, 42, 44 and 46 offset from the pin axis creates a stretch in the bolts 30 which helps ensure the bolts remain tight.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Mounting structure for mounting a tank of a dead tank circuit breaker to support structure, the tank having a flange extending from a body thereof, the support structure having bolt holes for receiving bolts, the mounting structure comprising:
   at least a pair of first bores extending into the flange in a first direction,
   at least a pair of second bores, each second bore extending into the flange in a direction generally transverse with respect to an associated first bore so that each second bore communicates with the associated first bore,
   a pin disposed in each of the second bores of the pair of second bores, each pin having a threaded pin bore that aligns axially with the associated first bore, and
   a bolt disposed through an associated bolt hole of the support structure, in an associated first bore, and in threaded engagement with the threaded pin bore of an associated pin so as to secure the tank to the support structure,
   wherein the mounting structure is in combination with the tank and flange, and wherein the flange has first, second, and third planar mounting surfaces, with the first, second and third planar mounting surfaces being non-coplanar with respect to each other so that one of the first, second or third planar mounting surfaces engages a planar surface of the support structure when the tank is secured to the support structure in one of three different mounting positions.

2. The mounting structure of claim 1, wherein an end of each pin includes a tapped hole.

3. The mounting structure of claim 1, wherein each first bore is elongated in a direction transverse with respect to said direction.

4. The mounting structure of claim 1, wherein three first bores and three second bores are provided in the flange, a pin being disposed in two of the three second bores for receiving an associated bolt, so that the tank can be mounted with respect to the support structure in one of the three different mounting positions.

5. The mounting structure of claim 1, wherein four of the first bores and four of the second bores are provided in the flange, a pin being disposed in two of the four second bores for receiving an associated bolt, so that the tank can be mounted with respect to the support structure in one of the three different mounting positions.

6. The mounting structure of claim 1, wherein the first bores are disposed through the mounting surfaces.

7. The mounting structure of claim 4, further comprising spacers disposed around certain of the bolts and disposed between the flange and the support structure.

8. A method of securing a tank of a dead tank circuit breaker to support structure, the tank having a flange extending from a body thereof, at least a pair of first bores extends into the flange in a first direction, at least a pair of second bores is provided with each second bore extending into the flange in a direction generally transverse with respect to an associated first bore so that each second bore communicates with the associated first bore, the support structure having bolt holes for receiving bolts, the method comprising the step of:

placing the tank on the support structure such that each first bore of the pair of first bores is aligned with an associated bolt hole in the support structure, placing a pin in each of the second bores of the pair of second bores, each pin having a threaded pin bore that aligns axially with the associated first bore, and inserting a bolt through each associated bolt hole of the support structure, into an associated first bore and into threaded engagement with the threaded pin bore of an associated pin so as to secure the tank to the support structure, wherein the flange has a first, second, and third planar mounting surfaces, with the first, second and third planar mounting surfaces being non-coplanar with respect to each other so that the tank placing step includes engaging one of the first, second or third planar mounting surfaces with a planar surface of the support structure in one of three different mounting positions.

9. The method of claim 8, wherein each first bore is elongated in a direction transverse with respect to said direction.

10. The method of claim 8, wherein three first bores and three second bores are provided in the flange, wherein the placing step includes aligning, based on a desired position selected from three different positions of the tank, two of the three first bores with two associated bolt holes in the support structure, and wherein the step of securing the pin includes securing a pin in each second bore that is associated with each aligned first bore.

11. The method of claim 8, wherein four first bores and four second bores are provided in the flange, wherein the placing step includes aligning, based on a desired position selected from three different positions of the tank, two of the four first bores with two associated bolt holes in the support structure, and wherein the step of securing the pin includes securing a pin in each second bore that is associated with each aligned first bore.

12. The method of claim 8, wherein the first bores are disposed through the mounting surfaces.

13. The method of claim 10, further comprising the step of placing spacers around certain of the bolts and between the flange and the support structure.

* * * * *